Figures 1, 2:
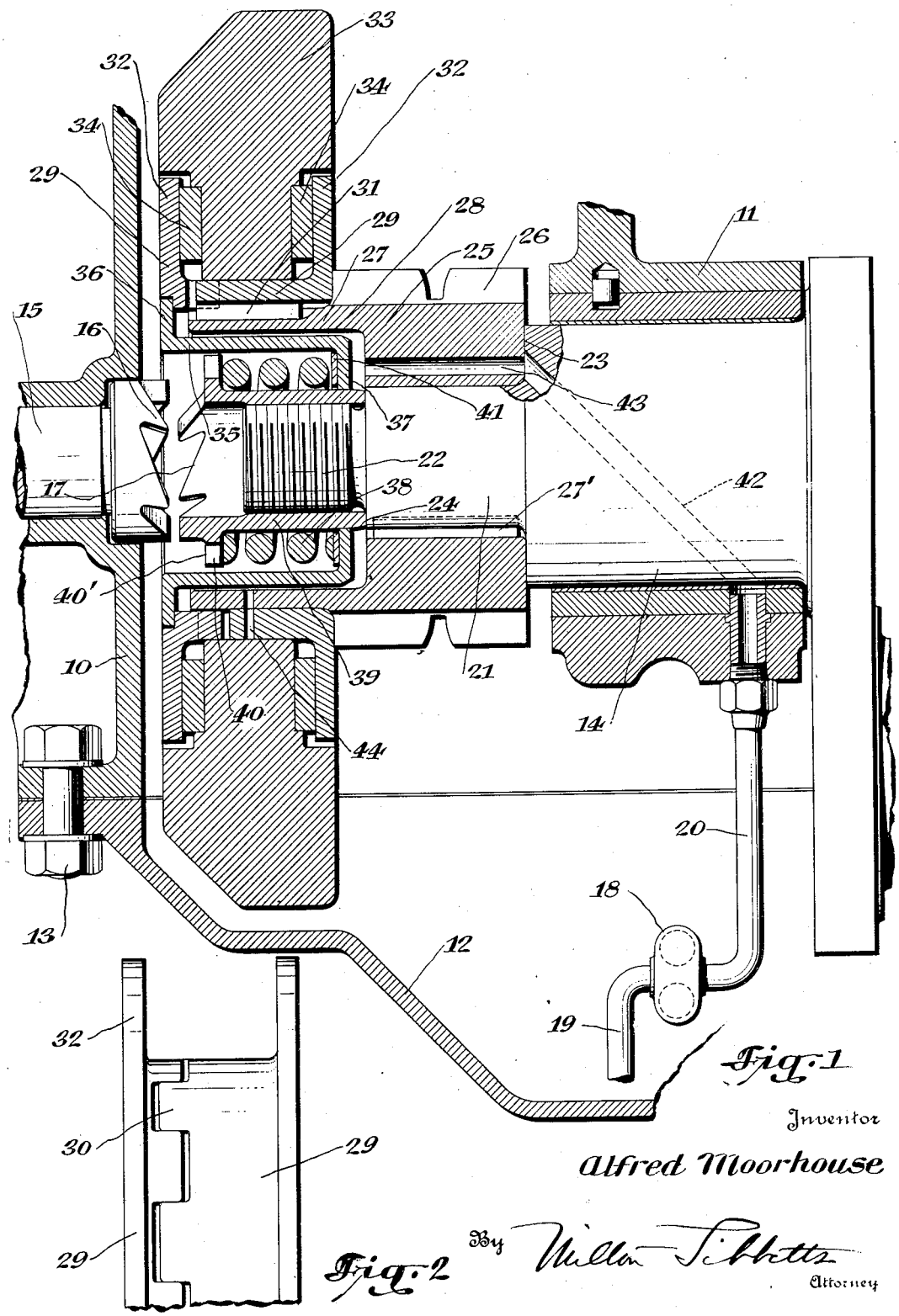

Aug. 23, 1927.

A. MOORHOUSE

INTERNAL COMBUSTION ENGINE

Filed Nov. 10, 1923

1,639,892

Inventor
Alfred Moorhouse
By William Sibbitts
Attorney

Patented Aug. 23, 1927.

1,639,892

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed November 10, 1923. Serial No. 673,872.

This invention relates to internal combustion engines and particularly to vibration dampers and their connections to the crankshaft.

One of the objects of the invention is to provide a vibration damper of the type comprising a frictionally connected fly-wheel which will be simple in its construction, positive in its action, and free from noise in its operation.

Another object of the invention is to provide a vibration damper with adequate lubrication means for its friction surfaces.

Another object of the invention is to provide a compact arrangement of the spring means of a vibration damper.

Other objects of the invention will appear from the following description taken in connection with the drawings, which form a part of this specification, and in which:

Fig. 1 is a vertical longitudinal section through the front end of an internal combustion engine embodying the invention; and Fig. 2 is an elevation of the upper part of the two friction rings of the vibration damper showing how they interlock.

The vibration damper shown is of the general type illustrated and described in patent to Lanchester No. 1,085,443, dated January 27, 1914.

Referring to the drawings, 10 represents the crankcase of an internal combustion engine having a main bearing 11 and a lower crankcase cover 12. A series of bolts 13 make the cover detachable from the main part of the crankcase.

A crankshaft 14 is mounted in the crankcase in the bearing 11 and a starting crank 15 is supported in the front end of the crankcase as shown. The starting crank has jaws 16 which are adapted to be engaged with similar jaws 17 as will be hereinafter more fully described.

Also mounted within and supported by the crankcase is an oil pump 18, shown somewhat diagrammatically, which pump is connected to withdraw oil from the bottom of the crankcase as shown at 19 and to discharge it through the pipe 20 to the main bearing 11 of the crankshaft. The other purposes of this lubrication means will be hereinafter described.

The crankshaft end is reduced in diameter as at 21 and 22 and the extreme end 22 is threaded as shown in the drawing. By this means a shoulder 23 is formed at the inner end of the reduced portion 21 and a shoulder 24 is formed at the inner end of the reduced portion 22.

The vibration damper of this invention is adapted to be supported upon the front end of the crankshaft and as shown it is supported directly upon a cylindrical element which in this case is a transmission element or gear or sprocket. This transmission element is indicated at 25 and it has teeth 26 which may be engaged by the teeth of another gear or by a chain passing over them. The element 25 is keyed upon the reduced portion 21 of the crankshaft, as shown at 27' so that it turns with and becomes an integral part of the crankshaft. It is formed with an extension 27 which overhangs the reduced portion 22 of the crankshaft and forms between it and said reduced portion an annular space 28. It is within this space that the spring means of the vibration damper is mounted.

The extension part 27 of the element 25 is cylindrical and has mounted thereon and keyed thereto a pair of interlocking rings or friction devices 29. These rings are shown more in detail in Fig. 2 and it is seen that they are formed with interlocking lugs and spaces 30 so that they will rotate together but may move axially relative to each other. The key means connecting these rings with the element 25 is shown at 31 in Fig. 1. Each of the rings 29 has a radial flange 32 facing oppositely each other as shown in both figures of the drawing. Mounted between the flanges 32 and upon the cylindrical portions of the rings 29 is the damper fly-wheel being adapted to rotate or oscillate, that is, move circumferentially relative to the rings 29.

Between the flanges 32 of the rings and the fly-wheel part 33 of the damper are friction rings or friction means 34 adapted to take the wear between the rings and the fly-wheel.

For retaining the fly-wheel and ring members of the damper on the extension 27 a flanged sleeve 35 is provided, this sleeve being mounted in the annular space 28 and having a flange 36 abutting against one of the rings 29 and thereby retaining both rings in position. The ring 35 also has a flange 37, at its inner end, which flange abuts against the inner end of a coil spring 38 surrounding the reduced portion 22 of the crankshaft. Between the spring 38 and the crankshaft, however, is an element 39 which is in the form of a sleeve or nut having the clutch jaws 17 on its outer end. This sleeve or nut is threaded on the portion 22 and it is provided with a flange 40 against which abuts the outer end of the coil spring 38 so that the spring is held between the flanges 37 and 40. The flange 40 is provided with notches 40' for a suitable spanner or wrench whereby the sleeve may be rotated. The degree of compression of the spring 38 is adjusted by one or more washers or shims 41 arranged between one end of the spring and one of the flanges referred to. This spring, by acting upon the sleeve 35 yieldingly retains the rings 29 and the fly-wheel 33 on the extension 27 and yieldingly presses the rings 29 towards each other thereby frictionally clamping the fly-wheel 33 between said rings. The inner end of the sleeve 39 abuts against the shoulder 24 above referred to just as the transmission element 25 abuts against the shoulder 23, and the sleeve 39 thereby retains the vibration damper on the element 25 and retains the element 25 in position on the end of the crankshaft.

The vibration damper is adapted to be lubricated under pressure from the bearing 11. For this purpose the crankshaft 14 is drilled diagonally as shown at 42 so that one end of the passage 42 will register with the outlet from the pipe 20 during each revolution of the crankshaft. A passage 43 leads from the other end of the passage 42 through the gear element 25 to the space 28 formed within the extension 27. The sleeve 35 is slightly smaller than the interior of the extension 27 so that the oil may pass around the outside of the sleeve and enter a passage 44 formed through the extension 27 and one of the rings 29. This latter passage leads to the exterior surface of the rings 29 and to the surfaces of the friction rings 34 so that all of the relatively moving surfaces between fly-wheel 33 and the rings 29 are lubricated under pressure. The oil escapes around the ends of the flanges 32 and falls back into the crankcase where it is again picked up by the pump 18 and re-circulated. By this arrangement the oil is fed under pressure from the crankshaft to the friction surfaces of the vibration damper without subjecting the starting crank support or bearing to oil pressure.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an engine, the combination with the crankshaft thereof having a threaded end, of a sleeve threaded thereon, a spring surrounding the sleeve, and a vibration damper having its parts held in frictional engagement by said spring.

2. In an engine, the combination with the crankshaft having a threaded end, of a sleeve threaded thereon, a spring surrounding said sleeve, a second sleeve surrounding said spring, a fly-wheel, and friction means between said fly-wheel and said crankshaft held in engagement by said spring and sleeves.

3. In an engine, the combination with the crankshaft thereof, of a transmission element mounted on the end thereof and having an extension, and a vibration damper mounted on said extension and including a spring within said extension.

4. In an engine, the combination with the crankshaft thereof, having an overhanging cylindrical part, of a vibration damper mounted on said overhanging part and including a spring within said overhanging part.

5. In an engine, the combination with the crankshaft thereof having a threaded end, of a gear mounted on the crankshaft adjacent said threaded end, and having a part overhanging said threaded end, a vibration damper mounted on said overhanging part and including a spring surrounding said threaded end.

6. In an engine, the combination with the crankcase having a bearing and the crankshaft mounted in said bearing with its end extending beyond said bearing, of a gear mounted on said extended end, a vibration damper mounted on said gear, and a spring for said vibration damper mounted within said gear.

7. In an engine, the combination with a crankshaft having a gear thereon, of a vibration damper comprising a fly-wheel part mounted on the outside of said gear, and a spring mounted on the inside of said gear.

8. In an engine, the combination with a crankshaft having a detachable element thereon, of a vibration damper comprising relatively movable parts mounted on the outside of said element and a spring part mounted on the inside of said element.

9. In an engine, a vibration damper and mounting comprising a hollow cylindrical support, a fly-wheel mounted on the outside of said support, and a spring mounted on the inside of said support and connected to the fly-wheel part.

10. In an engine, the combination with the crankshaft thereof having a threaded end, of a hollow cylindrical element mounted on the crankshaft and overhanging said end, and a vibration damper comprising a flywheel and friction elements mounted on said overhanging part, a flanged sleeve inside of said cylindrical element and surrounding said threaded end of the crankshaft, a sleeve on said threaded end and a spring mounted between said sleeves.

11. In an engine, the combination with the crankshaft thereof, of a hollow cylindrical element mounted on the crankshaft and overhanging the end thereof to form an annular space between said end and the interior of said element, and a vibration damper having a spring mounted within said annular space.

12. In an engine, the combination with the crankshaft thereof, of a hollow cylindrical element mounted on the crankshaft and overhanging the end thereof to form an annular space between said end and the interior of said element, and a vibration damper having a spring and a connecting sleeve mounted within said annular space.

13. In an engine, the combination with the crankshaft thereof, of a hollow cylindrical element mounted on the crankshaft and overhanging the end thereof to form an annular space between said end and the interior of said element, and a vibration damper mounted on the outside of said element and having a spring mounted within said annular space.

14. In an engine, the combination with the crankshaft thereof, of a hollow cylindrical element mounted on the crankshaft and overhanging the end thereof to form an annular space between said end and the interior of said element, and a vibration damper mounted on the outside of said element and having a spring in said annular space and a connecting sleeve between said spring and the parts on the outside of said element.

15. In an engine, the combination with the crankshaft having a jaw clutch thereon, said jaw clutch having a flange, of a vibration damper mounted on the crankshaft and including a spring mounted on said jaw clutch and abutting at one end against said flange, a sleeve surrounding said spring and having a flange abutting the other end of said spring, and said sleeve being connected to hold the parts of said damper in position.

16. In an engine, the combination with the crankshaft thereof having a starting jaw at its end, of a vibration damper mounted on said crankshaft and having friction surfaces, of means for feeding lubricant from said crankshaft to said friction surfaces without passing over said starting jaw.

17. In an engine, the combination with the crankshaft and means for feeding lubricant thereto under pressure, of a vibration damper mounted on said crankshaft and having friction surfaces, a spring for said damper, a sleeve surrounding said spring and connecting the damper with the spring, and means for feeding lubricant from said crankshaft around the outside of said sleeve to the friction surfaces of said damper.

18. In an engine, the combination with the crankshaft and means for feeding lubricant thereto, of a transmission element mounted on said crankshaft, a vibration damper mounted on said element, and means for feeding lubricant from said crankshaft through said element to said damper.

19. In an engine, the combination with the crankshaft and means for feeding lubricant thereto, of a vibration damper mounted on said crankshaft and having a sleeve, and means for feeding lubricant around the outside of said sleeve to the friction surfaces of said damper.

20. In an engine, the combination of the crankshaft and means for feeding lubricant thereto, of a gear mounted on said crankshaft and overhanging the end thereof, a vibration damper mounted on said overhanging part, a spring mounted on the end of the crankshaft, a sleeve surrounding said spring and connecting it with the damper, and means for feeding lubricant through said gear and around said sleeve to the friction surfaces of said damper.

In testimony whereof I affix my signature.

ALFRED MOORHOUSE.